(12) United States Patent
Kim et al.

(10) Patent No.: US 7,484,015 B2
(45) Date of Patent: Jan. 27, 2009

(54) APPARATUS AND METHOD FOR PROVIDING IMPROVED USER INTERFACE BETWEEN MULTIPLE NETWORK DEVICES

(75) Inventors: Hyun-woo Kim, Incheon (KR); Young-jae Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 11/603,189

(22) Filed: Nov. 22, 2006

(65) Prior Publication Data
US 2007/0162667 A1 Jul. 12, 2007

(30) Foreign Application Priority Data
Dec. 12, 2005 (KR) .................... 10-2005-0121816

(51) Int. Cl.
G06F 3/00 (2006.01)
G06F 3/048 (2006.01)

(52) U.S. Cl. .................. 710/16; 715/700; 715/763; 715/790; 715/810; 348/14.04

(58) Field of Classification Search .................. 710/16; 715/700, 763, 790, 810; 348/14.04
See application file for complete search history.

(56) References Cited

U.S. PATENT DOCUMENTS 6,930,730 B2 8/2005 Maxon et al.

2005/0198663 A1 9/2005 Chaney et al.

FOREIGN PATENT DOCUMENTS

| EP | 1271938 A2 | 1/2003 |
| KR | 10-2001-0091156 A | 10/2001 |
| KR | 2002-0026746 A | 4/2002 |
| KR | 10-2004-0067686 A | 7/2004 |
| KR | 10-2005-0035468 A | 4/2005 |

OTHER PUBLICATIONS

Consumer Electronics Association: "A User Interface for Home Networks Using Web-based Protocols", CEA Standard CEA-2027, Aug. 2004, p. 24.

*Primary Examiner*—Niketa I Patel
(74) *Attorney, Agent, or Firm*—Sughrue Mion, PLLC

(57) ABSTRACT

A method and apparatus for providing a user interface is provided. The apparatus includes a transmitting/receiving unit that receives a instruction signal transmitted by a control device, and a control unit in communication with the transmitting/receiving unit that determines whether devices connected to an audio-video (AV) network can be operated according to the instruction signal that is received, wherein the control device includes a first button that is operable to display a list menu that lists the devices connected to the AV network on a display, and a second button that is operable to display a function menu of at least one function corresponding to the devices on the display.

10 Claims, 9 Drawing Sheets

APPARATUS AND METHOD FOR PROVIDING IMPROVED USER INTERFACE BETWEEN MULTIPLE NETWORK DEVICES

CROSS-REFERENCE TO RELATED APPLICATION

This application is based on and claims priority from Korean Patent Application No. 10-2005-0121816 filed on Dec. 12, 2005 in the Korean Intellectual Property Office, the disclosure of which is incorporated herein in its entirety by reference.

BACKGROUND OF THE INVENTION

1. Field of the Invention

Apparatuses and methods consistent with the present invention relate to a user interface, and more particularly, to a play-oriented user interface for audio/video (AV) devices connected by a network.

2. Description of the Related Art

With the development of digital TV-oriented home network technologies, DVD players, home theaters, digital camcorders, set-top boxes, and other image and sound devices have become widely used in the home. A home theater typically includes a DVD player, a plasma display panel (PDP) or other display, an AV amplifier, a set-top box, and several speakers that can operate together as a single system.

The eXpandable Home Theater (XHT) standard, which is a home network solution selected by the Consumer Electronics Association (CEA) as a standard, is a technology that uses the Institute of Electrical and Electronics Engineers (IEEE) 1394 standard in conjunction with an Internet Protocol (IP) capable network that can securely transmit a plurality of high definition level signals, which enables a user to efficiently control image and sound devices connected to one or more TVs. IEEE 1394, which is a standard for managing transmissions between digital devices, may connect a communication device, a computer, and a home appliance as a single network, and exchange multimedia data at a high speed in the range of 100 Mbps to 1 Gbps. In IEEE 1394, up to 63 devices may be connected in series per each bus bridge, and the devices can communicate even when one device in the middle of a series connection is turned off.

The memory format of a set-top box may vary depending on the receiving method, such as terrestrial wave, satellite, and cable. The set-top box may include a hard disk that allows VCR functionality (e.g., recording and time shifting) to be embodied. Also, a TV can be efficiently used in various ways due to the addition of the hard disk.

FIGS. 1A and 1B depict a conventional UI for a home network.

As illustrated in FIG. 1A, an AV network includes a plurality of controlled devices, such as a DVD player, an amplifier, a set-top box and an inner room TV, and a host device, such as a living room TV 10. The AV network composes a single network using IEEE 1394. Each device provides a user interface (UI) to a host device 10. The devices on the AV network may be XHT devices. As discussed above, XHT is a technology that uses the IEEE 1394 standard.

As illustrated in FIG. 1B, a browser built in a TV (e.g., a living room TV 10) may receive information about devices on the network, which may be stored by the AV hard disk and displayed in a graphical user interface (GUI) format. The information is usually displayed on a screen using a status frame 20 and a control frame 30. In the TV-oriented home network, the AV hard disk operates as a UI data server, and the TV operates as a client that incorporates a browser. The Consumer Electronics Association standard CEA 2027 may be used as a user interface standard of the AV devices in the TV (PC)-oriented home network. Details of CEA 2027 are described in CEA 2027 version F: A User Interface for Home Networks Using Web-based Protocols_040616.

The status frame 20 and the control frame 30 are displayed in response to pressing a button on a remote controller. The status frame 20 provides the final GUI including icons and names. If a user selects a device in the status frame 20, the control frame 30 is displayed, and the user selects and sets a function of the device in the control frame 30.

However, the above configuration may interfere with viewing because the content that the user is viewing is covered by the status frame 20 and the control frame 30.

Also, if a user wants to record a broadcast, the user must select a set top box (STB) 22 among the devices, change the channel, and then select an AV hard disk 24 in the status frame 20. Also, the user operates recording and time shifting of the broadcast in the control frame, and changes the channel by selecting the STB 22 in the status frame 20.

However, it is difficult for a user to use the above configuration because the configuration requires that a user should understand the system. Also, since the functions of each unit are respectively separated, it is not efficient for a user to operate the device by selecting the device each time.

Accordingly, an efficient and easy UI for the AV network is needed.

SUMMARY OF THE INVENTION

The present invention provides an apparatus and method for providing a UI.

According to an aspect of the present invention, an apparatus for providing a user interface is provided, the apparatus including a transmitting/receiving unit that receives an instruction signal transmitted by a control device, and a control unit in communication with the transmitting/receiving unit that determines whether devices connected to an audio-video (AV) network can be operated according to the instruction signal that is received, wherein the control device includes a first button operable to display a list menu that lists the devices connected to the AV network, and a second button operable to display a function menu of at least one function corresponding to the devices on the display.

According to another aspect of the present invention, a method of providing a user interface is provided, the method including receiving a instruction signal transmitted by a control device, and determining whether devices connected to an audio-video (AV) network can be operated according to the instruction signal that is received, wherein the control device includes a first button operable to display a list menu that lists the devices connected to the AV network on a display, and a second button operable to display a function menu of at least one function corresponding to the devices.

BRIEF DESCRIPTION OF THE DRAWINGS

The above and other aspects of the present invention will become apparent by describing in detail exemplary embodiments thereof with reference to the attached drawings, in which.

DETAILED DESCRIPTION OF EXEMPLARY EMBODIMENTS OF THE INVENTION

Figure 1A:
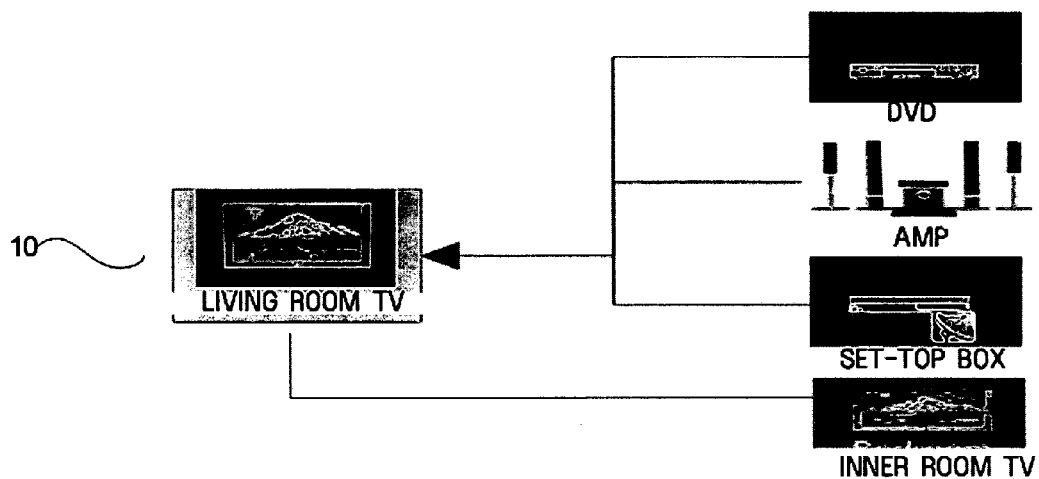
FIGS. 1A and 1B depict a conventional UI for a home network.
Figure 1B:
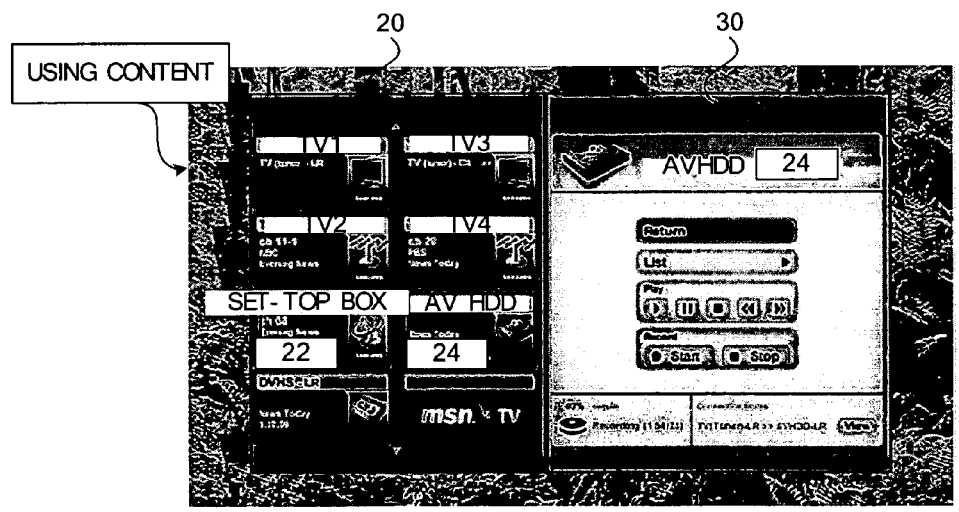

Exemplary embodiments of the present invention will be described in detail with reference to the accompanying drawings.

Aspects of the present invention may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 2:
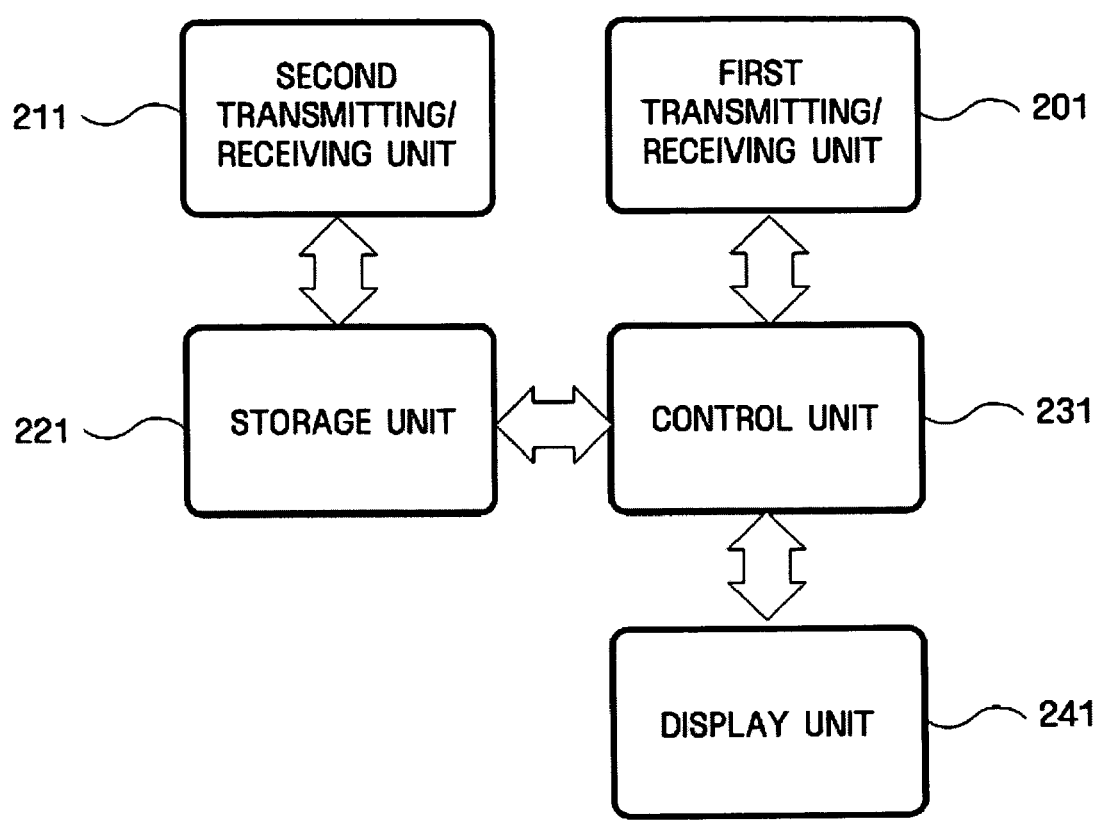
FIG. 2 is a block diagram of a UI according to an exemplary embodiment of the present invention.

FIG. 2 is a block diagram of a UI according to an exemplary embodiment of the present invention.

A UI-providing apparatus includes a first transmitting/receiving unit 201, a second transmitting/receiving unit 211, a storage unit 221, a control unit 231, and a display unit 241.

The first transmitting/receiving unit 201 receives an instruction signal using a control device. A remote controller may be used as the control device. The remote controller includes a first button (a select button 510) that displays a list menu 400 listing the devices connected to the AV network and a second button (a function button 520) that displays a function menu 410 corresponding to the devices.

The second transmitting/receiving unit 211 receives UI information from the devices on the AV network. Here, the devices on the AV network may be XHT devices. XHT is a technology that uses the IEEE 1394 standard.

The storage unit 221 stores information on the devices connected to the AV network. The information on devices may include information received by the second transmitting/receiving unit 211, names of the devices, icon information, and information on functions that can be operated in the devices. According to information of the storage unit 221, the control unit 231 determines whether the device can be operated according to the instruction signal received by the first transmitting/receiving unit 201. If an event is generated (e.g., a user turns on power of the STB or inserts a DVD into a DVD device), the control unit 231 may detect the corresponding information and store it.

If a user views a broadcast program by selecting a channel, the control unit 231 backs up the broadcast program at a predetermined time interval (e.g., 4.6 seconds). The storage unit 221 may include a memory chip and an AV hard disk.

The control unit 231 receives an instruction signal via the first transmitting/receiving unit 201, and determines whether the device can be operated according to the instruction signal. At this time, the information of the A/V network device stored in the storage unit 221 may be used. If a user clicks an electronic program guide ("TV guide") button 500 of the remote controller, a corresponding function is not operated when a device other than the STB is selected in the current system. Also, a record function 550 is not operated in a system that does not have an AV hard disk or if a copy protection scheme prevents recording of a program.

If the device can be operated according to the instruction signal, the device may be directly played when a user selects and operates the device via an enter key 533. If a predetermined device on the AV network has already been selected in the list menu 400 of the device, the control unit 231 may directly display the function menu 410 corresponding to the selected device when a user presses the function button without displaying the list menu 400.

When an event is generated (e.g., a user turns on power of the STB or inserts a DVD into a DVD device), if the control unit 231 determines that the corresponding device can be operated, the control unit 231 may provide an efficient connecting function to a user by displaying the menu of the device, in which the event is generated, as being separated by a predetermined mark (e.g., a highlight) from the auto-displayed list menu 400. If a plurality of display devices such as a TV and a personal computer (PC) are connected to a network, the mark may be omitted in order to avoid interfering with viewing.

The display unit 241 displays on a screen the control frame and a progress status of the function operated according to the instruction signal. The control frame includes a first frame displaying the list menu 400 of the device connected to the network, and a second frame displaying the function menu 410 corresponding to the device of the first frame. The display unit 241 may be a TV screen, a PC monitor, a liquid crystal display (LCD) or other type of display. When a user does not select a menu or operates a function of the menu via the enter key 533, the list menu 400, which is displayed on the first frame, and the function menu 410, which is displayed on the second frame, may be dissolved after a predetermined time, or displayed separately on the screen.

A detailed explanation of each function will be described with reference to FIGS. 5 to 7.

Figure 3:
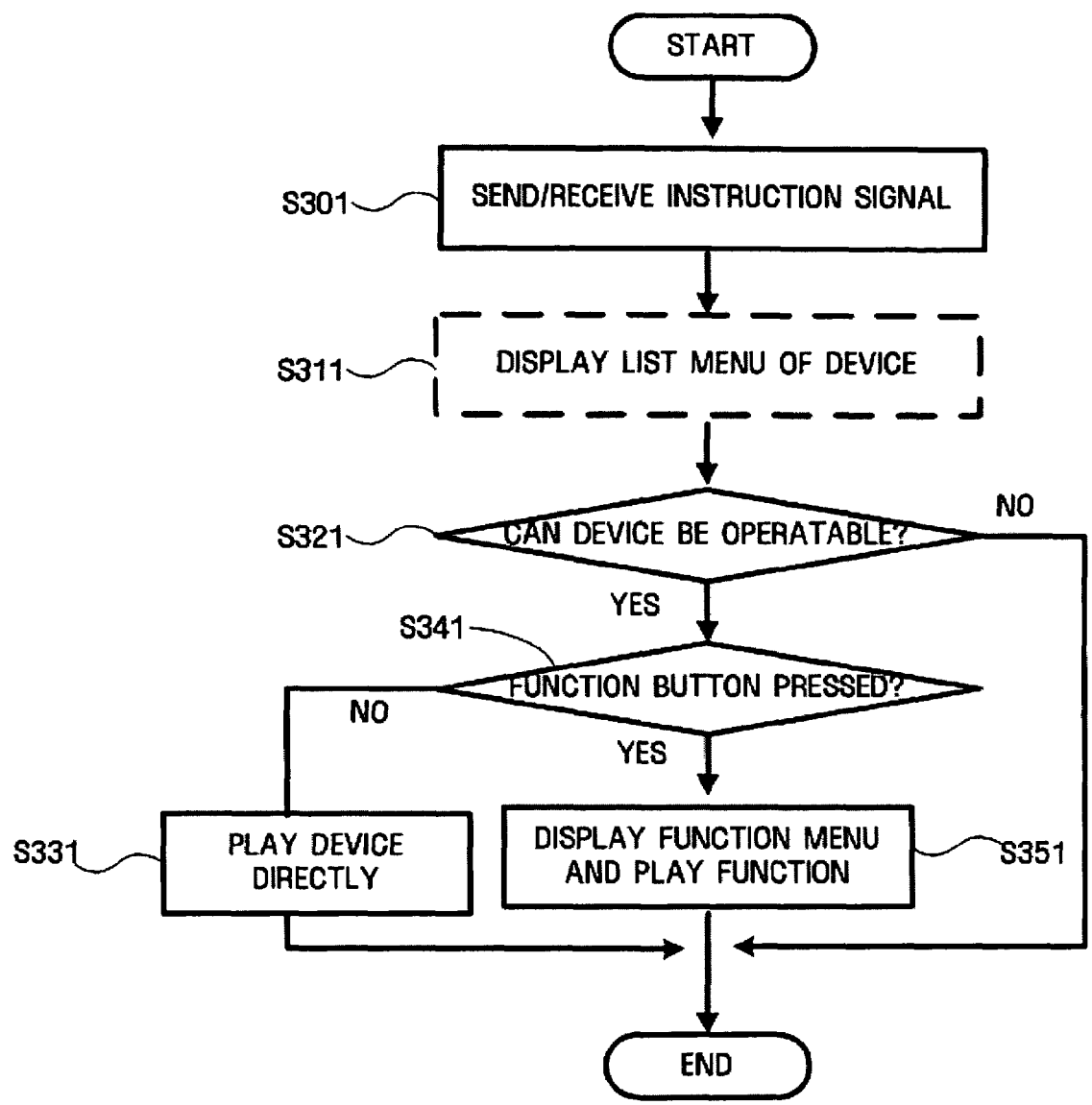
FIG. 3 is a flowchart of a UI according to an exemplary embodiment of the present invention.

FIG. 3 is a flowchart of a UI according to an exemplary embodiment of the present invention.

A user presses a button, e.g., the select button 510 in the control device, and the instruction signal is sent to a host device via the first transmitting/receiving unit 211 S310.

The host device, which receives the instruction signal, displays the list menu 400 stored in the storage unit 221 on the first frame via the display unit 241 S311. If a predetermined device on the AV network has already been selected in the list menu 400, then user selection of function button 520 results in the function menu 410 corresponding to the selected device being displayed without displaying list menu 300. Accordingly, operation S311 may be omitted.

When a user moves a focus of the GUI to a predetermined device in the list menu 400 on the first frame via a direction key button 530 of the remote controller and presses an enter (i.e., selection) key when the predetermined device is highlighted, the instruction signal is sent via the first transmitting/ receiving unit 201, and the control unit 231 directly plays the device if the device can be operated.

If a user presses the function button 520 after moving focus to the device that can be operated in the first frame, the function menu 410 corresponding to the selected device is displayed in the second frame. If a user presses a predetermined button in the function menu 410, a function corresponding to the button is played S341 and S351. If a predetermined device has already been selected in the first frame, not the list menu 400 but the function menu 410 corresponding to the device is displayed.

Figure 4:
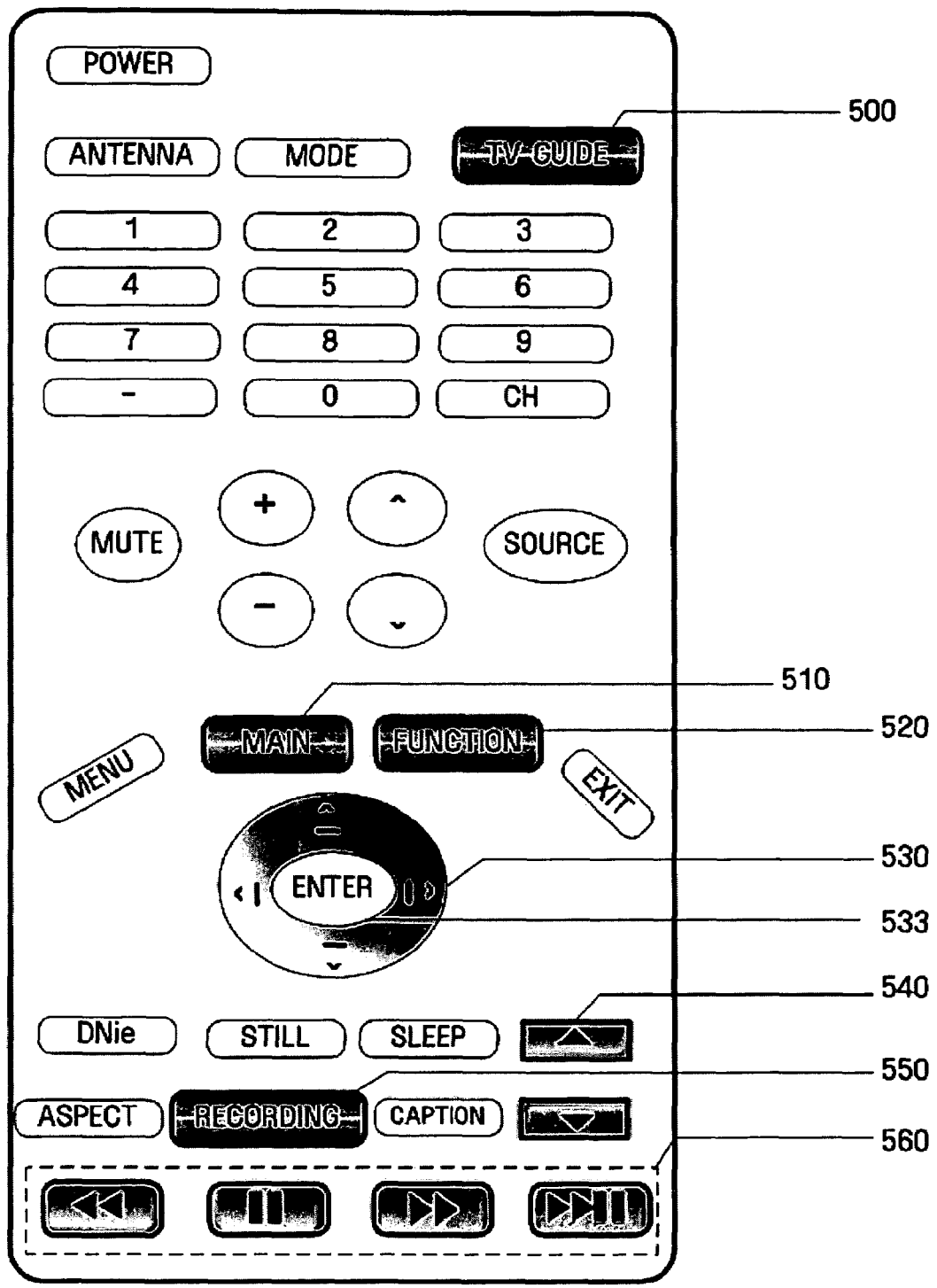
FIG. 4 depicts a configuration of a remote controller according to an exemplary embodiment of the present invention.

FIG. 4 depicts a configuration of a remote controller according to an exemplary embodiment of the present invention.

A user can operate the corresponding function by selecting predetermined content displayed on a TV via the remote controller.

The remote controller includes a plurality of control key buttons. The plurality of control key buttons may include the select button 510 displaying the list menu 400 in the first frame and the function button 520 displaying the function menu 410 in the second frame. In case of being classified by function, the remote controller may include a TV guide button 500, a volume and channel button 540, a record button 550, and an AN control button 560 performing a direct function, and includes a select button 510, a function button 520, and a direction key button 530 performing an indirect function. The direct function button performs a function corresponding to the device if the device on the ANV network can be operated.

Hereinafter, main components of the remote controller will be described.

The TV guide button 500 displays an electronic program guide (EPG) 416 of a satellite program provider or other program provider, such as cable or terrestrial broadcasters.

The select button displays the devices connected to the AV network on a host device (e.g., a TV screen) as a list.

The direction key button 530 moves a focus of the displayed menu.

The record button 550 may provide a live recording menu, a personal video recorder (PVR) menu, and a timing recording menu.

The AV control button 560 may provide a play option and a time shifting function.

The detailed operation of the main buttons of the remote controller will be described with reference to FIGS. 5 to 7.

Figure 5:
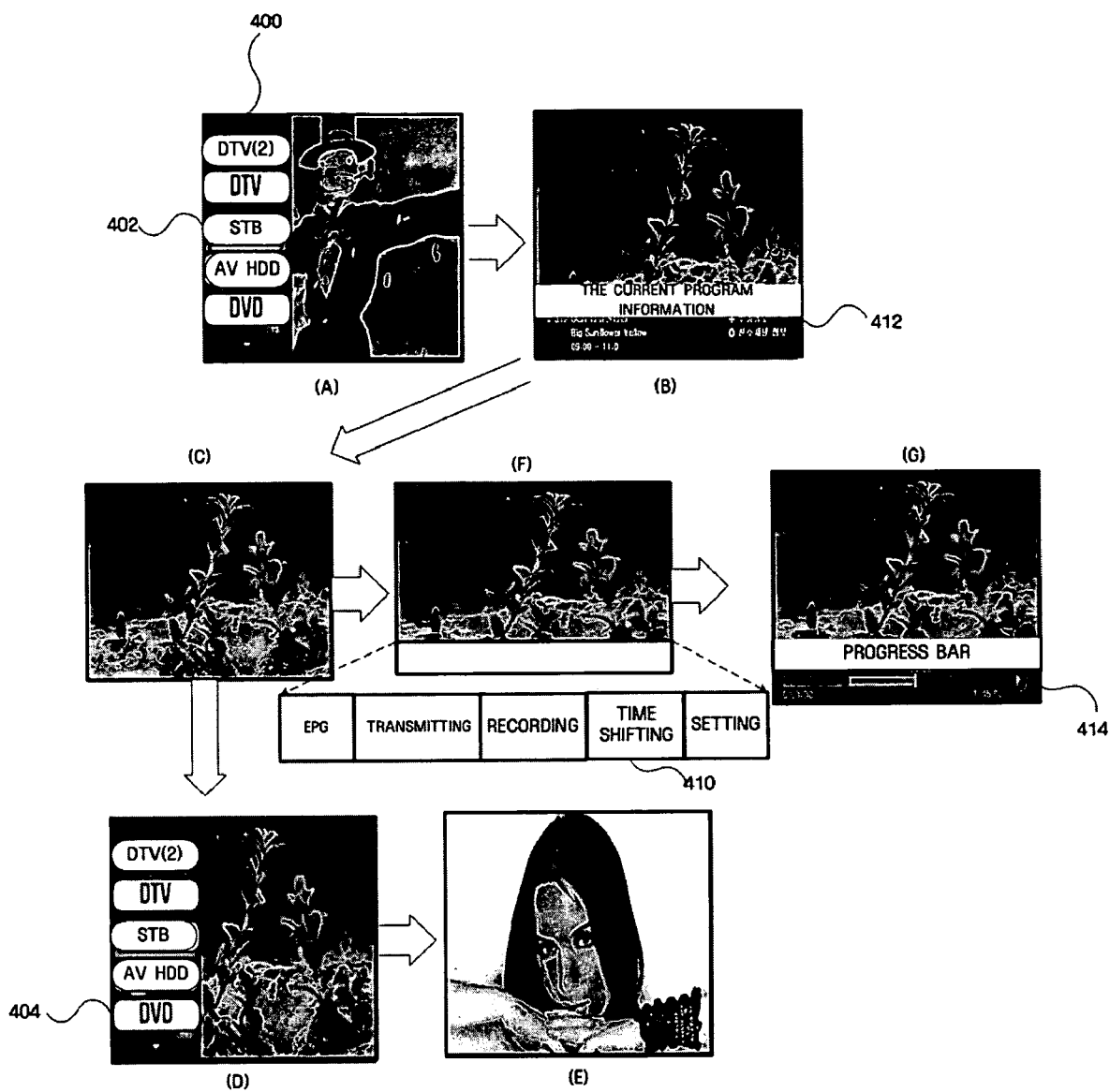
FIG. 5 depicts a UI and function buttons of a remote controller according to an exemplary embodiment of the present invention.

FIG. 5 depicts a UI and function buttons of a remote controller according to an exemplary embodiment of the present invention.

The remote controller includes a first button (the select button 510) that displays a list menu 400 of the devices connected to the AV network and a second button (the function button 520) that displays a function menu 410 corresponding to the devices. According to whether the first button is selected or the second button is selected, the list menu 400 and the function menu 410 are displayed separately.

In (A) of FIG. 5, when a user clicks the select button 510, the list menu 400 of the devices connected to the AV network is displayed in a first frame of a host device (TV). The first frame may be displayed so as to not cover a broadcast screen that a user is viewing by being placed one side of the TV screen. For example, a digital TV (DTV), a STB 402, an AV hard disk, and a DVD 404 are displayed in the list of devices. All the devices may be displayed in the first frame or the operable devices and the inoperable devices may be indicated separately.

When an event is generated (e.g., a user turns on power of the STB 402 or inserts a DVD into the DVD device), the list menu 400 is displayed, and the menu of the device, in which the event is generated, is highlighted, thereby conveniently providing a function. However, if several TVs are connected to the network, the highlight may be omitted in order to avoid interrupting other users' viewing. If a user does not select a menu or if the user selects a function of the menu via the enter key 533, the list menu 400 may be removed after a predetermined time.

In (B) of FIG. 5, if a user has selected STB 402, which can be operated after moving a focus of the menu via the direction key button 530, and then changes a channel on the STB 402, information 412 on the currently selected program and a broadcast screen are displayed. The information 412 may provide a channel number, a program name, and a date, which is removed out after a predetermined time.

In (C), (D), and (E) of FIG. 5, when a user clicks the select button 510, the list menu is displayed again. If a user changes to the DVD 404 and the DVD 404 is operable, the corresponding DVD screen is directly displayed.

In (F) and (G) of FIG. 5, when a user clicks the function button 520, the function menu corresponding to the selected device (e.g., a STB) is displayed in the second frame, and a function selected from the function menu 410 is performed in accordance with the user selection. A progress indication of the selected function may be displayed for a user via a progress bar 414.

If a predetermined device on the AV network has previously been selected via the list menu 400, it is possible to directly display the function menu 410 corresponding to the selected device when a user clicks the function button 520 without displaying the list menu 400.

The list menu displayed on the first frame and the function menu 410 displayed in the second frame may be removed after a predetermined time if a user does not select a menu function or if a menu function is selected from the menu via an enter key 533. The function menu 410 provides menus including an electronic program guide (EPG), recording, time shifting, and setting, which correspond to functions of the STB.

As described above, an exemplary embodiment of the present invention provides a convenient UI that does not overlap a screen that a user is viewing, thereby allowing easy and efficient operation of a device and a play-oriented function corresponding to the device.

In FIGS. 6 and 7, main components of the remote controller illustrated in FIG. 4 will be described as being classified by function. However, the classification is only exemplary, as the components are not necessarily required to be classified in this manner.

Figure 6A:
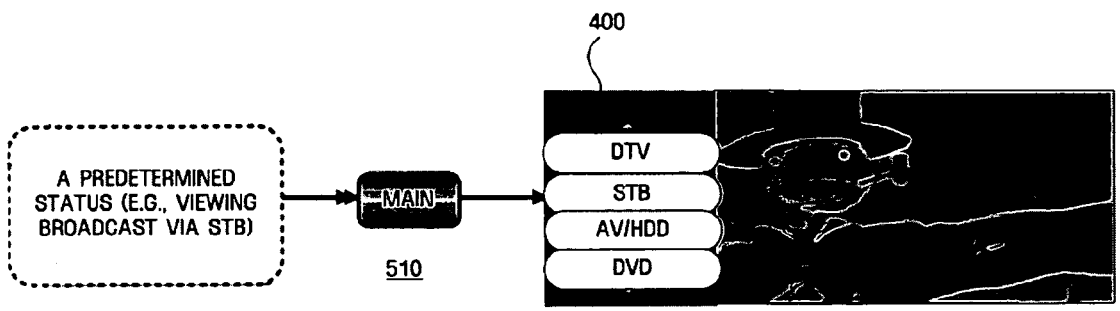
FIGS. 6A and 6B depict a button that performs an indirect function of a remote controller according to an exemplary embodiment of the present invention.
Figure 6B:
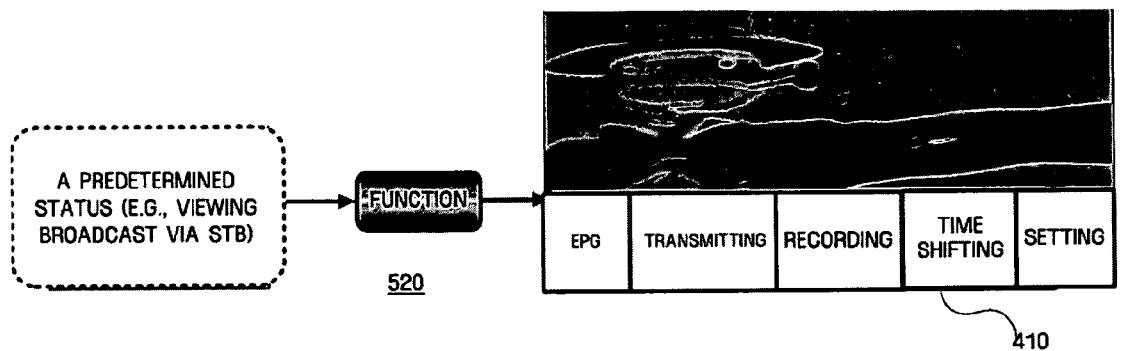

FIGS. 6A and 6B depict a button that performs an indirect function of a remote controller according to an exemplary embodiment of the present invention.

The parts of the remote controller performing an indirect function include the select button 510, the function button 520, the direction key button 530, and the enter key button 533.

As illustrated in FIG. 6A, if a user presses the select button 510 while viewing a broadcast, the list menu showing the list of the devices connected to the AV network is displayed. However, display of the list menu may be prevented if the broadcast is being recorded. The list menu may be removed if the user presses the select button 510 again.

As illustrated in FIG. 6B, if a user clicks the function button 520 while the system is operating in a predetermined status, the function menu 410 corresponding to the status of the system (e.g., viewing a broadcast via the STB) is displayed. As above, display of the function menu may be prevented if the broadcast is being recorded. Also, the list menu may be removed if the user presses the function button 520 again.

The direction key button 530 moves focus among the displayed menu items when menus are open. After a menu item is selected, the direction key button 530 operates a function corresponding to the selected menu item.

FIG. 7 depicts a button that performs a direct function of a remote controller according to an exemplary embodiment of the present invention.

The parts of the remote controller performing a direct function may include the TV guide button 500, a common control button, the record button 550, and the AV control button 560.

Figure 7A:
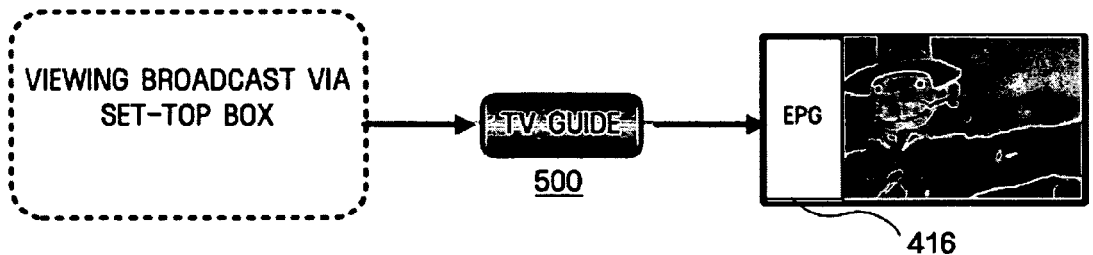
FIGS. 7A-7D depict a button that performs a direct function of a remote controller according to an exemplary embodiment of the present invention.

As illustrated in FIG. 7A, if a user clicks the TV guide button 500 while the user is viewing a broadcast via the STB, the EPG 416 is directly operated because the device has already been selected. The EPG 416 provides information on a broadcast program list and the start/end time of each program. The TV guide button 500 may be prevented from being operated when a device other than the STB is selected.

Figure 7B:
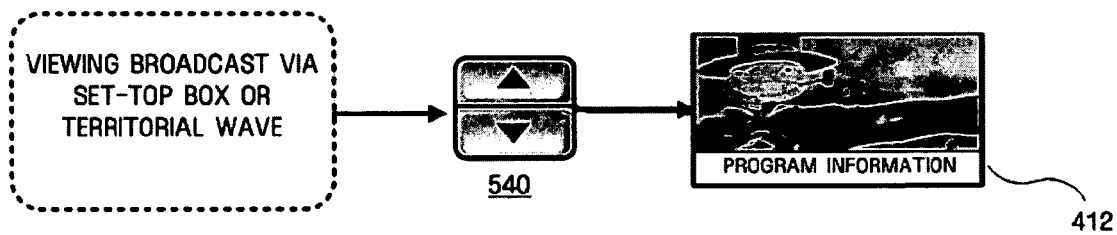

As illustrated in FIG. 7B, the common control button includes the volume and channel button 540 and a number key button. If a user clicks the channel button 540 while viewing a broadcast via the STB or terrestrial wave antenna, for example, the channel that the user is viewing is directly changed. When a channel is changed, a detailed operation including a program explanation based on a rule provided by a broadcaster may be performed. A user may also control and change the volume and channel by direct input using the number key button.

Figure 7C:
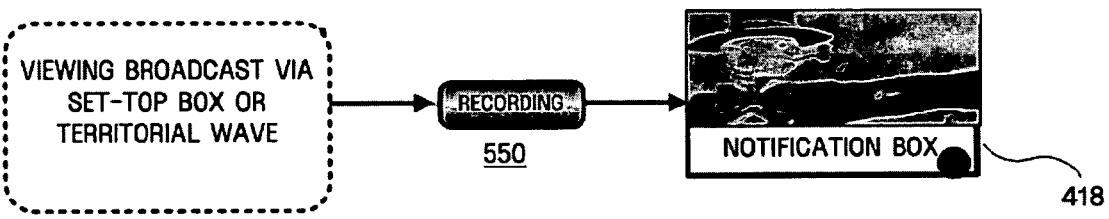

As illustrated in FIG. 7C, if a user clicks the record button 550 while viewing a broadcast received from a source, such as the STB or a terrestrial wave antenna, the broadcast is directly recorded to the AV hard disk. A user may be informed of recording status via a notification box 418. The notification box 418 may display a red color while recording and a green color when the recording has ended. The recording status may be indicated by several formats and sounds. If no AV hard disk is present or if copy protection prevents recording of a broadcast program, then the record function 550 may be prevented from operating.

Figure 7D:
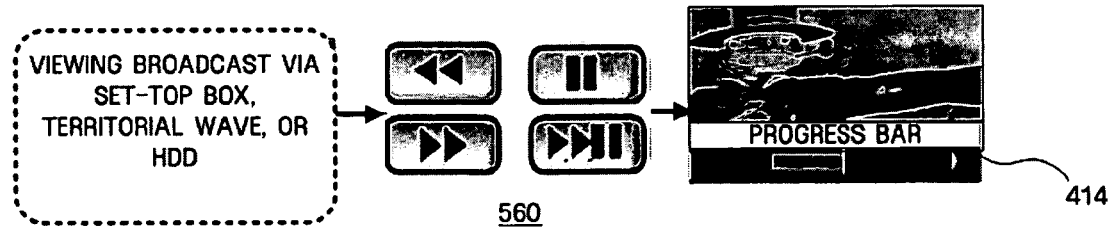

As illustrated in FIG. 7D, if a user presses the AV control button 560 while viewing a broadcast received from the STB or terrestrial wave antenna, for example, or while the user is viewing a recorded programming from the AV hard disk, a function (e.g., stop, rewind, and fast forward) corresponding to the user's selection is directly operated. The progress bar 414 may be displayed in order to show the status to a user. Display of the progress bar may be prevented when a play button is pressed. If no AV hard disk is present or if time shifting is not otherwise available, then the function of the AV control button 560 may be prevented.

If a user views a broadcast program by selecting a channel, the broadcast content may be backed up in the AV hard disk at a predetermined time interval (e.g., 4.6 seconds). Accordingly, if a user selects the AV hard disk, a dialogue box 820 may be provided to allow the user to select a program that has been recorded for viewing. A user can select and play desired content from the AV hard disk list of the dialogue box 820, and can operate stop, rewind, and fast forward buttons while viewing the selected content. Also, a process wizard 810, which may provide functionality such as content sharing and TV locking (i.e., viewing restriction of selected programming), is provided according to a user's selection. The content sharing enables a user to play a DVD connected to the network but located in one room while a user is viewing a TV located in another room, such as a living room TV. Content sharing may also allow satellite broadcasts to be viewed by several TVs without requiring an additional receiver if a satellite broadcast receiver is connected to a single TV. In addition, content sharing may enable a user to recommend a broadcast program the user is viewing to another TV viewer in another location (e.g., an inner room), to rewind a program while viewing a live broadcast, to record a broadcast via the hard disk, and to view TV, DVD or satellite broadcast in another location. The operation of FIGS. 7A-7D may be performed in accordance with a remote control standard, such as Consumer Electronics Association 931-B or Audio/Video Control (AV/C).

The interface provided to a user will be described in a navigation format with reference to FIG. 8.

Figure 8:
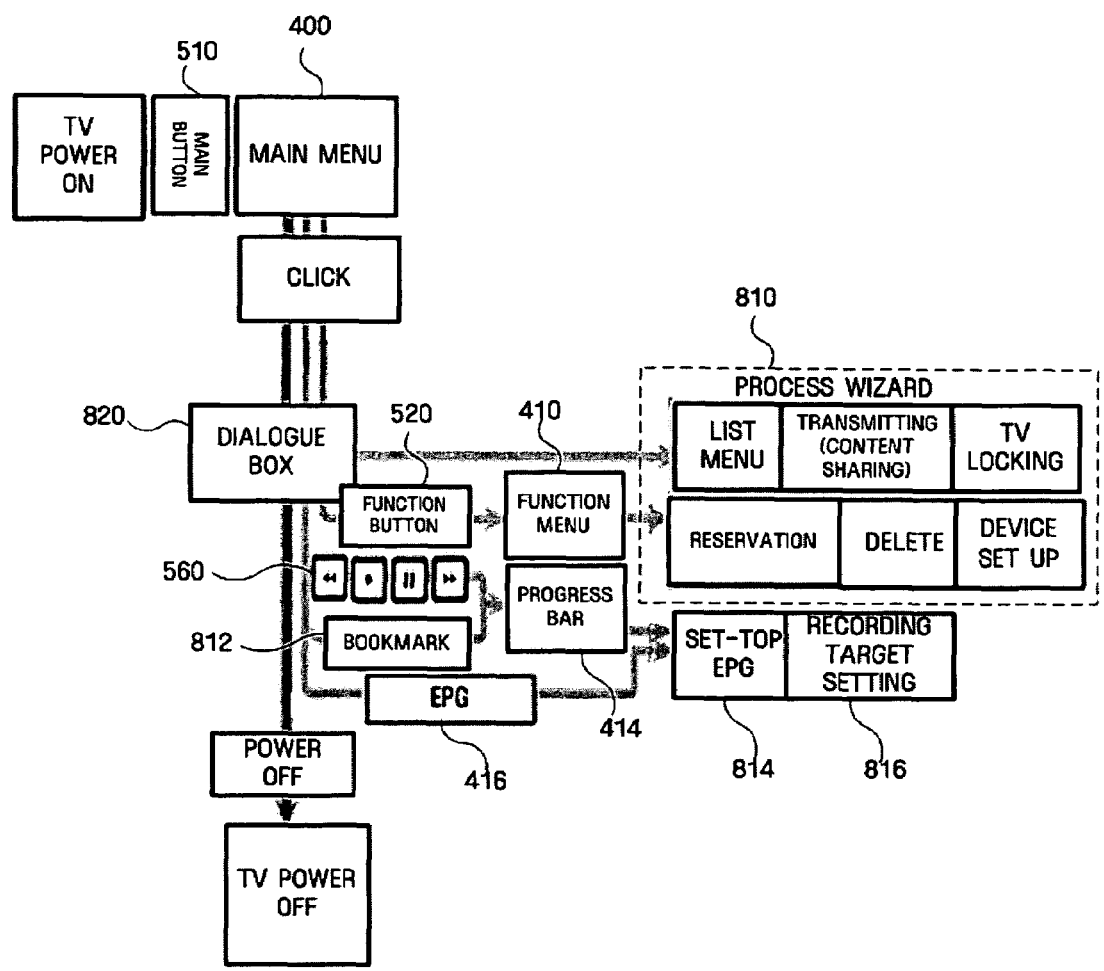
FIG. 8 depicts a navigation based on a UI according to an exemplary embodiment of the present invention.

FIG. 8 depicts navigation through a UI according to an exemplary embodiment of the present invention.

Play-oriented navigation for controlling the corresponding devices is illustrated.

When a user turns on a TV, and presses the select button 510, the list menu 400 is displayed on the TV screen to allow selection of the devices connected to a network.

When a user presses the function button 520 after selecting the device in the list menu 400, the function menu 410 of the device is displayed. According to the user's selection, the process wizard 810 corresponding to the function menu 410 on a panel is operated. The process wizard 810 may include reservation, delete, and device set up. If a user selects the AV hard disk, a dialogue box 820 for determining whether to store the broadcast that the user is viewing or to view a recorded program may be provided. Here, the process wizard 810 based on the dialogue box 820 includes a list showing the currently recorded broadcasts, transmission (i.e., content sharing), and TV locking.

If a user clicks the AV control button 560 to perform a direct function, a function (e.g. stop, rewind, and fast forward) corresponding to the user's selection is directly operated. The progress bar 414 may be displayed in order to show the progress to a user. The progress bar 414 may be also displayed when a user clicks a bookmark button 812. If a user clicks a TV guide button 500, the EPG 416 is directly provided, thereby operating a function of a set-top EPG 814 or a record target setting 816.

A hierarchical function menu button composed of a plurality of depths a device on the AV network will be described as a navigation format with reference to FIG. 9.

Figure 9:
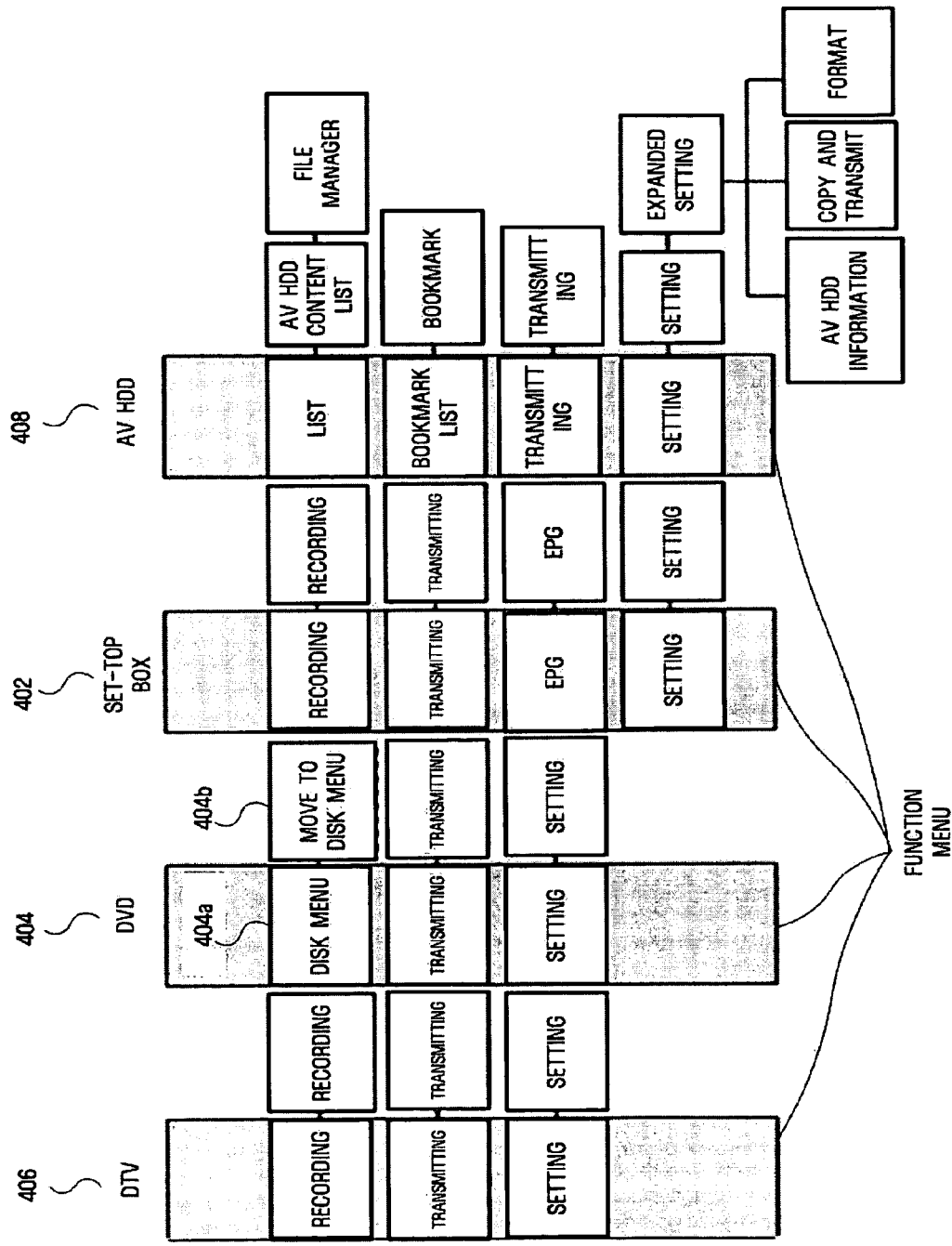
FIG. 9 depicts a hierarchical configuration of a menu button according to an exemplary embodiment of the present invention.

FIG. 9 depicts a hierarchical configuration of menu buttons according to an exemplary embodiment of the present invention.

If a user clicks the select button 510, the list menu 400 is displayed in order to show the current devices connected to the network. The list menu 400 includes the DTV 406, the DVD 404, the STB 402, and the AV hard disk 408. If a user clicks the function button 520, the function menu 410 corresponding to the selected device is displayed, and a process corresponding to the function is performed according to a user's selection.

If a user selects the DVD 404 in the list menu 400, and clicks the function button 520, a menu, which includes a disk menu, transmitting, and setting, is displayed in the function menu 410. If a user clicks the disk menu 404A in the function menu 410, the focus is moved to the disk menu 404B. The STB 402 provides menus including recording, transmitting (i.e., content sharing), EPG, setting the function menu 410, and performs the function corresponding to each menu. The DTV 406 provides the function menu 410 including recording, transmitting, and setting. The AV hard disk 408 provides the function menu 410 including a list, a bookmark list, transmission (i.e., content sharing), and setting 408. The depth of the menu provided according to a function may be expanded, thereby providing various services to a user.

According to an exemplary embodiment of the present invention, the apparatus and method providing a user interface enables easy and efficient operation of an AV device and a play-oriented function corresponding to the device via a single remote controller without interrupting a user's viewing in the AV network.

Although exemplary embodiments of the present invention have been described, those skilled in the art will appreciate that various modifications, additions and substitutions are possible, without departing from the scope and spirit of the invention as disclosed in the accompanying claims.

What is claimed is:

1. An apparatus for providing a user interface, the apparatus comprising:
   a transmitting/receiving unit that receives an instruction signal transmitted by a control device; and
   a control unit in communication with the transmitting/receiving unit that determines whether devices connected to an audio-video (AV) network can be operated according to the instruction signal that is received,
   wherein the control device includes a first button operable to display a list menu that lists the devices connected to the AV network on a display and a second button operable to display a function menu of at least one function corresponding to the devices on the display,
   wherein a predetermined device among the devices connected to the AV network is selected via the list menu that is displayed, and the control unit directly plays the predetermined device if the control unit determines that the selected device can be operated according to the instruction signal that is received, and
   wherein the list menu and the function menu are displayed in a first frame and a second frame, respectively, and the first frame and the second frame do not overlap a video signal that is displayed on the display together with the list menu and function menu.

2. The apparatus of claim 1, wherein the function menu is displayed without the list menu if the second button is pressed in a state where the predetermined device has previously been selected,
   wherein the function menu includes functions corresponding to the predetermined device.

3. The apparatus of claim 1, wherein the list menu and the function menu of the device are displayed separately on the display without overlapping.

4. An apparatus for providing a user interface, the apparatus comprising:
   a transmitting/receiving unit that receives an instruction signal transmitted by a control device; and
   a control unit in communication with the transmitting/receiving unit that determines whether devices connected to an audio-video (AV) network can be operated according to the instruction signal that is received,
   wherein the control device includes a first button operable to display a list menu that lists the devices connected to the AV network on a display, and a second button operable to display a function menu of at least one function corresponding to the devices on the display, and
   wherein the function menu is displayed on the display automatically if an event is generated by a predetermined device among the devices connected to the AV network such that the function menu includes functions corresponding to the predetermined device.

5. The apparatus of claim 4, wherein the list menu is displayed with the function menu if the event is generated by the predetermined device,
   wherein the predetermined device is highlighted in the list menu among the list of devices connected to the AV network.

6. A method of providing a user interface, the method comprising:
   receiving an instruction signal transmitted by a control device; and
   determining whether devices connected to an audio-video (AV) network can be operated according to the instruction signal that is received,
   wherein the control device includes a first button operable to display a list menu that lists the devices connected to the AV network on a display and a second button operable to display a function menu of at least one function corresponding to the devices,
   wherein a predetermined device among the devices connected to the AV network is selected via the list menu that is displayed, and the control unit directly plays the predetermined device if the control unit determines that the selected device can be operated according to the instruction signal that is received, and
   wherein the list menu and the function menu are displayed in a first frame and a second frame, respectively, and the first frame and the second frame do not overlap a video signal that is displayed on the display together with the list menu and function menu.

7. The method of claim 6, wherein the function menu is displayed without the list menu if the second button is pressed in a state where the predetermined device has previously been selected,
   wherein the function menu includes functions corresponding to the predetermined device.

8. The method of claim 6, wherein the list menu and the function menu of the device displayed separately on the display without overlapping.

9. A method of providing a user interface, the method comprising:
   receiving an instruction signal transmitted by a control device, and
   determining whether devices connected to an audio-video (AV) network can be operated according to the instruction signal that is received,
   wherein the control device includes a first button operable to display a list menu that lists the devices connected to the AV network on a display, and a second button operable to display a function menu of at least one function corresponding to the devices,
   wherein the function menu is displayed on the display automatically if an event is generated by a predetermined device among the devices connected to the AV network such that the function menu includes functions corresponding to the predetermined device.

10. The method of claim 9, wherein the list menu is displayed with the function menu if the event is generated by the predetermined device,
    wherein the predetermined device is highlighted in the list menu among the list of devices connected to the AV network.

* * * * *